(No Model.)
C. B. DE LAMARRE.
PULLEY BLOCK.
No. 390,845.  Patented Oct. 9, 1888.
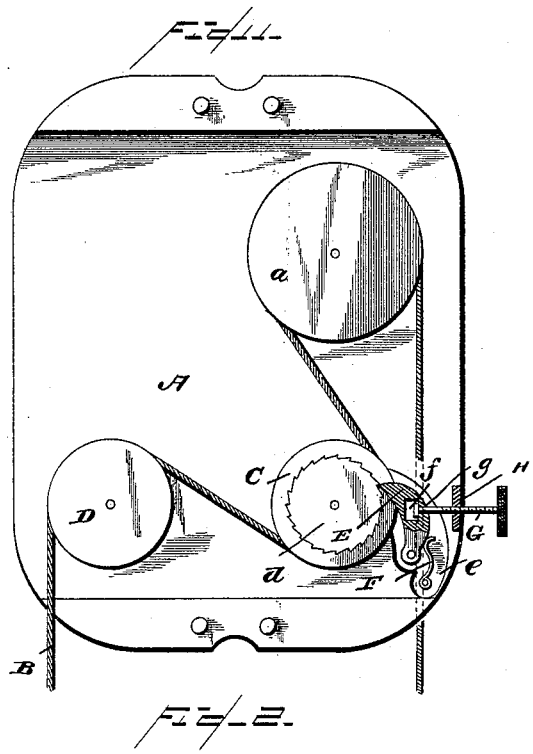
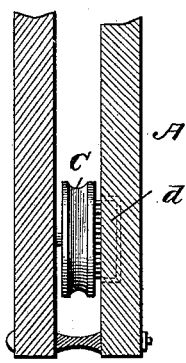
WITNESSES.
INVENTOR.
Chas. B. DeLamarre.
By Wm R Stringfellow
Attorney.

UNITED STATES PATENT OFFICE.

CHARLES B. DE LAMARRE, OF BILOXI, MISSISSIPPI.

PULLEY-BLOCK.

SPECIFICATION forming part of Letters Patent No. 390,845, dated October 9, 1888.

Application filed October 8, 1887. Serial No. 251,806. (No model.)

*To all whom it may concern:*

Be it known that I, CHARLES B. DE LAMARRE, a citizen of the United States, residing at Biloxi, in the county of Harrison and State of Mississippi, have invented certain new and useful Improvements in Pulleys; and I do declare the following to be a full, clear, and exact description of the invention, such as will enable others skilled in the art to which it appertains to make and use the same.

This invention relates to hoisting apparatus, and the improvements will be fully understood from the following description and claim, when taken in connection with the accompanying drawings, in which—

Figure 1 is a partial sectional view of a pulley-block, showing my improvements applied; and Fig. 2 is a sectional detail view.

Referring by letter to the said drawings, A indicates the frame or block, which may be of any suitable size and form, it being preferably composed of a front and a back plate suitably held apart for the reception of the various working parts, as will be presently explained. Within this block or frame is journaled a large pulley, a, over which the elevating-rope B passes. Beneath this large pulley and within the block is journaled a smaller pulley, D, and in the same transverse plane of the block as this pulley D and directly beneath the large pulley a is journaled a pulley, C.

Fixed to one side of the pulley C is a ratchet-wheel, d. Adjacent to this pulley C and its ratchet-wheel the block or frame is recessed, as shown at e, and in this recess is arranged a pivoted pawl or dog, E, which is designed to engage the teeth of the said ratchet. I also arrange in this recess a spring, F, which bears on the pawl or dog and normally holds the same between the teeth of the ratchet. It will be seen that the teeth of the ratchet are so arranged with relation to the dog that when the rope is running in one direction the pulley carrying the pawl may turn, but when moving in the opposite direction the said pulley will be prevented from turning. The rope is first carried over the pulley D, thence under the pulley C, up and over the large pulley, when it is brought down within reach of the operator. It will thus be seen that the frame or block is secured in the ordinary manner, and the article to be elevated attached to the branch b of the rope. Now, by drawing down upon the opposite branch of the rope the branch b and its attached article will be raised. It will also be seen that as the operator releases his grip from the rope the dog having engaged the teeth of the pawl will prevent the pulley C from reversing its movement and consequently the rope.

As it is sometimes desirable, however, to have the pulleys reverse their movements and the weighted end of the rope go down, I have provided means for holding the pawl out of engagement with the ratchet.

In carrying out this feature of my invention I form an enlarged recess, f, in the forward portion of the pawl, and from this recess I lead a small aperture, g, for the insertion of a threaded rod, G, having a hand-wheel on its outer end, as shown. This rod G is headed within the recess of the pawl, so as to allow a limited movement—that is to say, the pawl may be allowed to serve in connection with the spring without manipulating the threaded rod. This rod has a threaded bearing, H, so that it may be moved with respect to the pawl.

It will be seen that when it is desirable to bring the pawl out of operation it is only necessary to turn the rod G, so as to draw it outwardly.

From the foregoing description, when taken in connection with the accompanying drawings, the operation of my invention will be obvious.

Having described my invention, what I claim is—

The combination, with the pulley-block, of the pulleys journaled therein, as described, and the threaded bearing G, secured to the block, the ratchet-wheel d, fixed to the pulley C, the spring-pressed pawl E, having the recess f near its forward end, and the threaded rod having its forward end headed and arranged in the said recess of the pawl, substantially as and for the purposes specified.

In testimony whereof I affix my signature in presence of two witnesses.

CHS. B. DE LAMARRE.

Witnesses:
GEO. P. HEWES,
T. J. STEWART.